US007818762B2

(12) United States Patent
Liu et al.

(10) Patent No.: US 7,818,762 B2
(45) Date of Patent: Oct. 19, 2010

(54) SYSTEM AND METHOD FOR GATHERING INFORMATION FROM USERS OF MOBILE AUDIOVISUAL BROADCAST CONTENT

(75) Inventors: Charles Liu, Chapel Hill, NC (US); Kåre A. Agardh, Rydebäck (SE)

(73) Assignee: Sony Ericsson Mobile Communications AB, Lund (SE)

( * ) Notice: Subject to any disclaimer, the term of this patent is extended or adjusted under 35 U.S.C. 154(b) by 357 days.

(21) Appl. No.: 11/776,601

(22) Filed: Jul. 12, 2007

(65) Prior Publication Data

US 2009/0019502 A1 Jan. 15, 2009

(51) Int. Cl.
*H04N 7/173* (2006.01)
*H04N 7/16* (2006.01)

(52) U.S. Cl. ......................... 725/24; 725/133; 725/141; 725/153

(58) Field of Classification Search .................. 725/24, 725/133, 141, 153
See application file for complete search history.

(56) References Cited

U.S. PATENT DOCUMENTS 6,567,984 B1 * 5/2003 Allport ...................... 725/110
7,634,794 B1 * 12/2009 Paik et al. ..................... 725/62
2007/0192785 A1 * 8/2007 Pellinat et al. ................ 725/24

FOREIGN PATENT DOCUMENTS

EP 1732326 12/2006
WO 2007064380 6/2007

OTHER PUBLICATIONS

International Search Report and Written Opinion from corresponding International Application No. PCT/IB08/000034.

* cited by examiner

*Primary Examiner*—Hunter B Lonsberry
(74) *Attorney, Agent, or Firm*—Renner, Otto, Boisselle & Sklar, LLP

(57) ABSTRACT

A method of interactive broadcasting may include broadcasting audiovisual content for receipt by mobile electronic devices that are present within a communication range of a wireless access point. An information submission mechanism may be made available to the mobile electronic devices over the wireless access point. Users of the mobile electronic devices may submit information using the information submission mechanism to a server. The submitted information may be responsive to a request for user input related to the audiovisual content.

20 Claims, 4 Drawing Sheets

SYSTEM AND METHOD FOR GATHERING INFORMATION FROM USERS OF MOBILE AUDIOVISUAL BROADCAST CONTENT

TECHNICAL FIELD OF THE INVENTION

The technology of the present disclosure relates generally to interactive broadcasting and, more particularly, to a system and method for gathering information from users of mobile electronic devices.

DESCRIPTION OF THE RELATED ART

Mobile and/or wireless electronic devices are becoming increasingly popular. For example, laptop computers, mobile telephones, portable media players and portable gaming devices are now in wide-spread use. In addition, the features associated with certain types of electronic devices have become increasingly diverse. To name a few examples, many electronic devices have cameras, text messaging capability, Internet browsing capability, electronic mail capability, video playback capability, audio playback capability, image display capability and handsfree headset interfaces.

Many mobile electronic devices are capable of receiving audiovisual content that is delivered as part of a broadcast, such as a mobile broadcast (e.g., mobile television or mobile radio). This content may originate from a service provider that distributes content on a wide scale to users across a large area, such as a metropolitan area, all or part of a state or province, or a country. This type of content also may originate from a local source, such as an operator of an establishment (e.g., a sports arena, a bar or nightclub, a train station or airport, or any other location where a group of people may be present). The broadcast may be carried out using a multicast (e.g., point-to-multipoint) content delivery technique, a point-to-point content delivery technique, a streaming content delivery technique, or any other appropriate technique.

While the users of the mobile electronic devices may tune to these broadcasts to receive audiovisual content, lacking is a mechanism that allows the broadcasting entity or the operator of the establishment at which the user is located to solicit information from the users. Also lacking is a mechanism to allow the users to relay information back to the broadcasting entity or the operator.

SUMMARY

To enhance a user's experience during consumption of audiovisual content that is broadcast to a mobile electronic device, disclosed are a system and method for gathering information from the user. The information may be gathered by a local entity to engage multiple users in activities and/or to poll the users for information or opinions. In another implementation, the information may be gathered by an entity that broadcasts over a wide area to collect responses from one or more groups of users where the members of each group are located in relatively close proximity to each other.

According to an aspect of the disclosure, a method of interactive broadcasting includes broadcasting audiovisual content for receipt by mobile electronic devices that are present within a communication range of a wireless access point; providing an information submission mechanism that is available to the mobile electronic devices over the wireless access point; and receiving information for the mobile electronic devices via the information submission mechanism.

According to an embodiment of the method, the broadcast of audiovisual content is a mobile broadcast.

According to an embodiment of the method, the broadcast of audiovisual content is carried out using one of a multicast content delivery technique, a point-to-point content delivery technique or a streaming content delivery technique.

According to an embodiment of the method, the information submission mechanism is a webpage or a user interface hosted by a server that is in operable communication with the wireless access point.

According to an embodiment of the method, a link to the webpage is transferred to the mobile electronic device over a broadcast channel used to broadcast the audiovisual content.

According to an embodiment of the method, the webpage is a temporary homepage posted to the mobile electronic device when the mobile electronic device establishes communication with the wireless access point.

According to an embodiment of the method, the information submission mechanism is a message receiver function for receiving a message transmitted by the mobile electronic device.

According to an embodiment of the method, the received information is a response of a user of the mobile electronic device to a question used to solicit an opinion of the user regarding the audiovisual content.

According to an embodiment of the method, the received information is a user participation in an activity arranged in coordination with the broadcast of the audiovisual content.

According to an embodiment, the method further includes providing a prize to the user of a selected one of the mobile electronic devices from which information was received.

According to an embodiment of the method, the prize is transferred electronically to the selected mobile electronic device.

According to an embodiment, the method further includes identifying an identity of the selected one of the mobile electronic devices.

According to an embodiment of the method, the mobile electronic devices that are present within the communication range of the wireless access point form a group of mobile electronic devices.

According to an embodiment, the method further includes combining the information collected from the group of mobile electronic devices to assess consensus reaction to the audiovisual content.

According to an embodiment of the method, the consensus reaction to the audiovisual content is compared to a consensus reaction to the audiovisual content that is derived from at least one other group of mobile electronic devices that are serviced by one or more remotely located wireless access points.

According to another aspect of the disclosure, a second method of interactive broadcasting includes receiving a broadcast of audiovisual content with a mobile electronic device and playing back the audiovisual content to a user of the mobile electronic device; establishing a data communication link with a wireless access point that services other mobile electronic devices that receive the broadcast; and submitting information from the mobile electronic device to a server via the wireless access point, the information responsive to a request for user input related to the audiovisual content.

According to an embodiment of the second method, the broadcast of audiovisual content is a mobile broadcast.

According to an embodiment of the second method, the information is submitted using a webpage or a user interface hosted by the server.

According to an embodiment of the second method, the submitted information is one of a response to a question used to solicit an opinion of the user regarding the audiovisual content or a user participation in an activity arranged in coordination with the broadcast of the audiovisual content.

According to another aspect of the disclosure, a system for interactive broadcasting includes a broadcaster used to broadcast audiovisual content to plural mobile electronic devices; a wireless access point to provide network connectivity to the mobile electronic devices; and a server that hosts an information submission mechanism that is available to the mobile electronic devices over the wireless access point and through which information that is responsive to a request for user input related to the audiovisual content is received.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

The terms “comprises” and “comprising,” when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
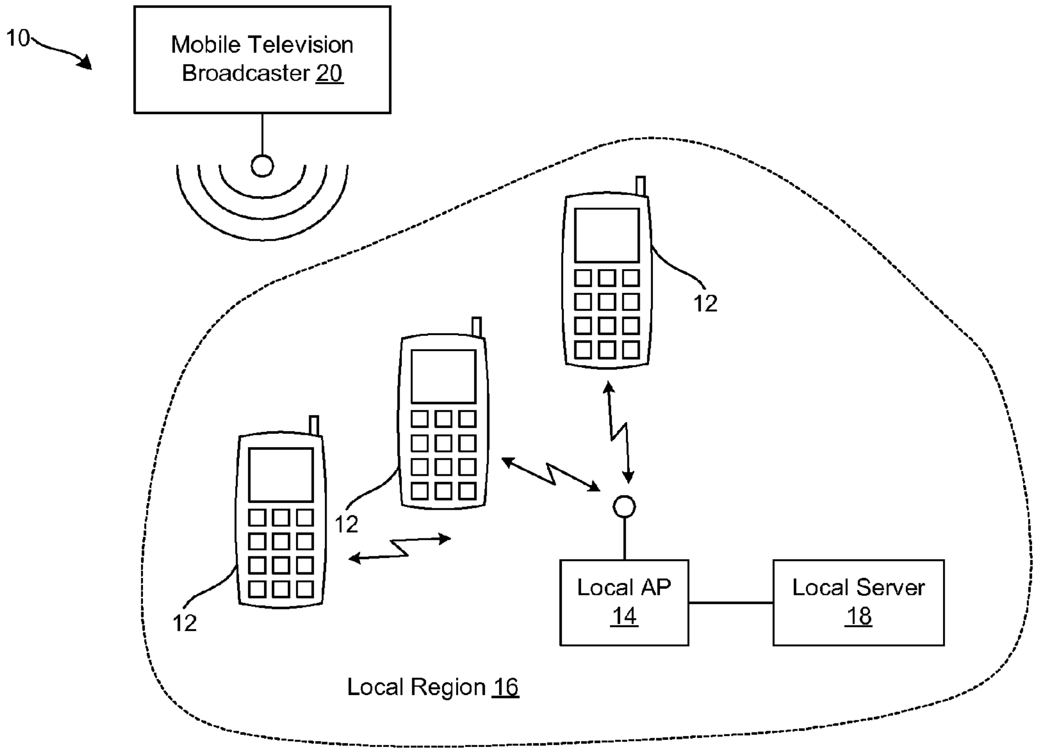
FIG. 1 is a block diagram of an exemplary system for gathering information from consumers of mobile audiovisual broadcasts.

Embodiments will now be described with reference to the drawings, wherein like reference numerals are used to refer to like elements throughout. It will be understood that the figures are not necessarily to scale.

The interchangeable terms “electronic equipment” and “electronic device” include portable radio communication equipment. The term “portable radio communication equipment,” which hereinafter is referred to as a “mobile radio terminal,” includes all equipment such as mobile telephones, pagers, communicators, electronic organizers, personal digital assistants (PDAs), smartphones, portable communication apparatus or the like.

In the present document, embodiments are described primarily in the context of a mobile telephone as a mobile electronic device. It will be appreciated, however, that the illustration and description of a mobile telephone is exemplary and other types of mobile electronic devices may include, but are not limited to, a media player, a gaming device and a computer.

Referring initially to FIG. 1, illustrated is a system 10 for gathering information from consumers of mobile audiovisual broadcasts that deliver content in a digital format. Mobile audiovisual broadcasts may include any mechanism by which audiovisual content is broadcast to mobile electronic devices for immediate playback, such as mobile radio or mobile television. For purposes of an example, the mobile audiovisual content will be described in the context of mobile television. It will be appreciated that other types of broadcasts are possible including, but not limited to, multicast content delivery techniques, point-to-point content delivery techniques, and streaming content delivery techniques.

The system 10 may advantageously collect information from a group of users that are each located in relatively close proximity to each other. Each user (or more than one user) may be associated with a mobile electronic device, which will be referred to by example as a mobile telephone 12 for purposes of this description. In one embodiment, a group of users is established when the mobile telephones 12 associated with the users are located within communication range of a local wireless access point (AP) 14. The range of the local AP 14 may define a local region 16. The local AP 14 may be a wireless networking access point, such as a WiFi access point based on the IEEE 802.11 standard, a WiMax access point based on the IEEE 802.16 standard, etc.

In the embodiment of FIG. 1, the local region 16 is defined by the communication range of the local AP 14. It will be appreciated that two or more local APs 14 collectively may be used to define the local region 16. It is contemplated, however, that the local region 16 will generally correspond to a place at which users may gather. For instance, the place may be a sports venue, a theater, a bar, a nightclub, a restaurant, a recreation center, a park, a school, a classroom or lecture hall, a workplace, a train station, an airport, or similar location. The mobile telephones 12 may interface with the local AP 14 so that data may be exchanged between the mobile telephones 12 and the local AP 14.

In the embodiment of FIG. 1, the local AP 14 is interfaced with a local server 18. The local server 18 may be a computer system that is operated by a person or entity that is affiliated with the place covered by the service area of the local access point 14 (e.g., the local region 16). By way of example, the local server 18 may be operated by a proprietor of the location. The local server 18 may be configured as a typical computer system used to carry out server functions and may include a processor configured to execute software containing logical instructions that embody the functions of the local server 18 and a memory to store such software. The memory of the local server 18 may store information collected from the mobile telephones 12 that are located within the local region 16. The information may be stored in any appropriate format, including a database structure. Software that is executed by the local server 18 may process the information that is collected from the mobile telephones 12. The local server 18 also may host an information submission mechanism, such as an Internet webpage (e.g., a hypertext mark-up language (HTML) page) or other user interface that may be accessed by the mobile telephones 12 via the local AP 14. Therefore, in one embodiment, a wireless local area network (WLAN) is established so that the mobile telephone 12 may interface with the local server 18.

The system 10 may further include a broadcaster 20. In the illustrated embodiment, the broadcaster 20 broadcasts mobile audiovisual content (e.g., mobile television). But, as indicated above, other types of broadcasts may be broadcast by the broadcaster 20. The broadcaster 20 may have a broadcast range that is larger than the local region 16. As will be described in greater detail below, the content broadcast by the broadcaster 20 may originate locally, such as by the operator of the local server 18. Alternatively, the content broadcast by the broadcaster 20 may originate remotely, such as by a service provider that delivers broadcast content to subscribers. The service provider may supply content over multiple channels. To receive the broadcast content, each mobile telephone 10 may include a receiver that is compatible with the broadcast protocol of the broadcaster 20. As an example, the content may be broadcast using digital video broadcasting-handheld (DVB-H).

Figure 2:
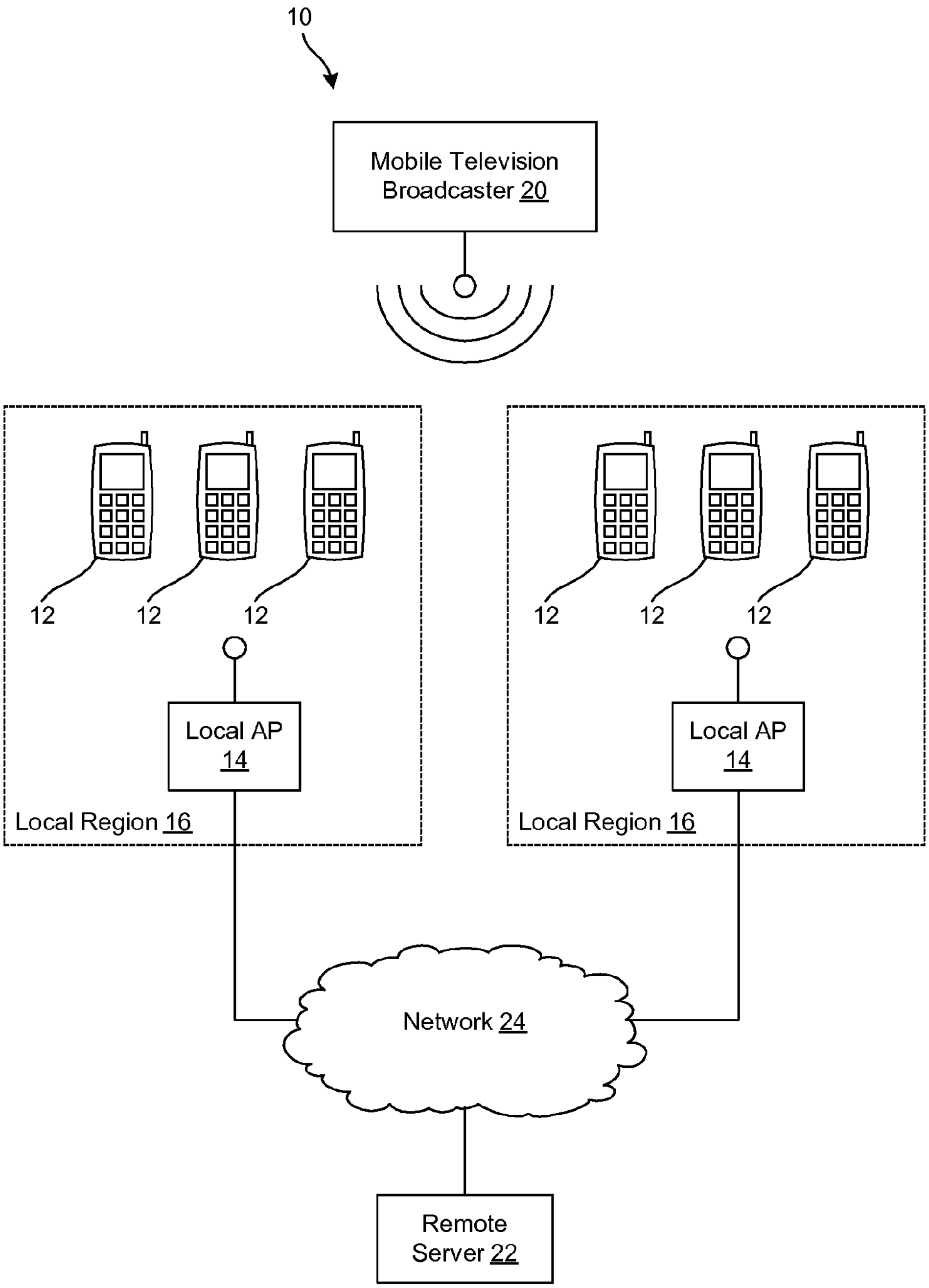
FIG. 2 is a block diagram of another exemplary system for gathering information from consumers of mobile audiovisual broadcasts.

Referring to FIG. 2, illustrated is another exemplary system 10' for gathering information from consumers of mobile audiovisual broadcasts. The system includes plural local regions 16 that each has an area defined by the communications range of an associated local AP 14 (or plural local APs 14). The local AP 14 for each of the local regions 16 services mobile electronic devices (e.g., the mobile telephones 12 of the illustrated example) that are located in the corresponding local region 16. In this manner, plural user groups may exist and each group may be associated with a place, such as the places described with respect to the local region 16 of FIG. 1. The places may be remotely located, such as in different parts of a city or in different cities.

In the embodiment of FIG. 2, each of the local APs 14 is communicatively interfaced with a remote server 22. The interfacing of the local APs 14 with the remote server 22 may be accomplished over a network 24, which may include any appropriate network servers, backhaul components, wireless links, and so forth. Also, the network 24 may rely on the Internet.

The remote server 22 may be a computer system that is operated by a person or entity that is interested in collecting information from the users of the mobile telephones 12. In one embodiment, the server 22 may be used to aggregate user responses on a local region 16 by local region 16 basis. Analysis may be made to identify differences in responses from local region 16 to local region 16 and/or to identify trends in responses. While only two local regions 16 are illustrated in FIG. 2, it will be understood that more than two local regions 16 may form part of the system 10'.

Similar to the system 10, the system 10' may further include a broadcaster 20 that is operated by a content service provider to deliver audiovisual content to the mobile telephones 12 of each local region 16. In the illustrated embodiment, the broadcaster 20 broadcasts mobile audiovisual content (e.g., mobile television). But, as indicated above, other types of broadcasts may be broadcast by the broadcaster 20. Multiple broadcasters 20 may be present to serve diversely located local regions 16.

By way of example, the remote server 22 may be operated by the service provider that provides the mobile audiovisual content or by some other person or entity that is interested in interacting with users of the mobile telephones 12 during the broadcast of mobile audiovisual content. Similar to the local server 18, the remote server 22 may be configured as a typical computer system used to carry out server functions and may include a processor configured to execute software containing logical instructions that embody the functions of the remote server 22 and a memory to store such software. The memory of the remote server 22 may store information collected from the mobile telephones 12 that are located within the various local regions 16. The information may be stored in any appropriate format, including a database structure. Software that is executed by the remote server 22 may process the information that is collected from the mobile telephones 12. The remote server 22 also may host an information submission mechanism, such as an Internet webpage or other user interface that may be accessed by each mobile telephone 12 via the local AP 14 that services the local region 16. Therefore, in one embodiment, a WLAN is established so that the mobile telephone 12 may interface with the remote server 22.

With continuing reference to FIGS. 1 and 2, the functionality carried out by any of the mobile telephones 12, the local server 18 and the remote server 22 may be embodied as executable code that is resident in and executed by the respective device. In one embodiment, these functions are embodied as programs that are stored on appropriate computer or machine readable media.

Figure 3:
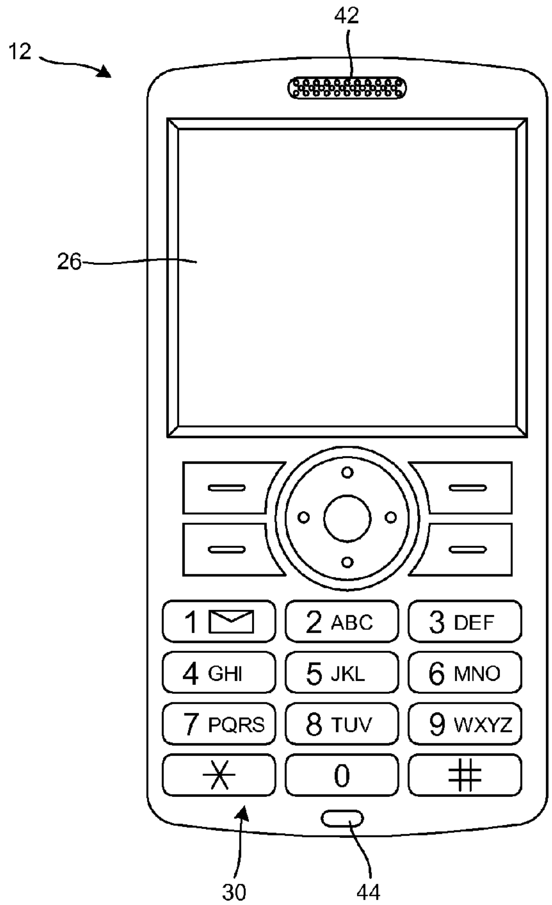
FIG. 3 is a schematic view of a mobile telephone as an exemplary mobile electronic device from which information may be gathered.
Figure 4:
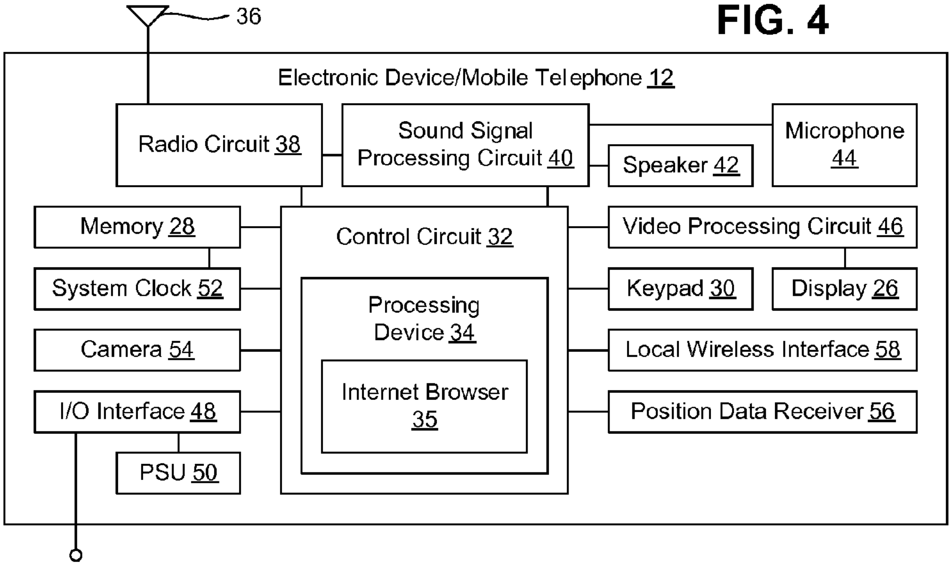
FIG. 4 is a block diagram of the mobile telephone of FIG. 3.

FIGS. 3 and 4 illustrate details of the mobile telephone 12 while the mobile telephone 12 serves as an exemplary mobile electronic device used to receive and playback content from a mobile audiovisual broadcast and to interact with at least one of the local server 18 or the remote server 22. The mobile telephone 12 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 12 may include a display 26. The display 26 displays information to a user such as operating state, time, telephone numbers, contact information, various menus, etc., that enable the user to utilize the various features of the mobile telephone 12. The display 26 also may be used to visually display content received by the mobile telephone 12 and/or retrieved from a memory 28 (FIG. 4) of the mobile telephone 12. The display 26 may be used to present images, video and other graphics to the user, such as photographs, mobile television content and video associated with games.

A keypad 30 provides for a variety of user input operations. For example, the keypad 30 may include alphanumeric keys for allowing entry of alphanumeric information such as telephone numbers, phone lists, contact information, notes, text, etc. In addition, the keypad 30 may include special function keys such as a "call send" key for initiating or answering a call, and a "call end" key for ending or "hanging up" a call. Special function keys also may include menu navigation and select keys to facilitate navigating through a menu displayed on the display 26. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 26. Also, the display 26 and keypad 30 may be used in conjunction with one another to implement soft key functionality.

The mobile telephone 12 may include call circuitry that enables the mobile telephone 12 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 12 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 28, executing applications to allow user interaction with the data, displaying video and/or image content associated with the data, outputting audio sounds associated with the data, and so forth.

FIG. 4 represents a functional block diagram of the mobile telephone 12. For the sake of brevity, many features of the mobile telephone 12 will not be described in great detail. The mobile telephone 12 includes a primary control circuit 32 that is configured to carry out overall control of the functions and operations of the mobile telephone 12. The control circuit 32 may include a processing device 34, such as a central processing unit (CPU), microcontroller or microprocessor. The processing device 34 executes code stored in a memory (not shown) within the control circuit 32 and/or in a separate memory, such as the memory 28, in order to carry out operation of the mobile telephone 12. The memory 28 may be, for example, one or more of a buffer, a flash memory, a hard drive, a removable media, a volatile memory, a non-volatile memory, a random access memory (RAM), or other suitable device. In one arrangement, the memory 28 may include a non-volatile memory (e.g., a NAND or NOR architecture flash memory) for long term data storage and a volatile memory that functions as system memory for the control circuit 32. The volatile memory may be a RAM implemented with synchronous dynamic random access memory (SDRAM), for example. The memory 28 may exchange data with the control circuit 32 over a data bus. Accompanying control lines and an address bus between the memory 28 and the control circuit 32 also may be present.

In addition, the processing device 34 may execute code that is used to interface with the local server 18 and/or the remote server 22. In one embodiment, the code may be an Internet browser 35, such as a wireless application protocol (WAP) Internet browser.

Continuing to refer to FIGS. 3 and 4, the mobile telephone 12 includes an antenna 36 coupled to a radio circuit 38. The radio circuit 38 includes a radio frequency transmitter and receiver for transmitting and receiving signals via the antenna 36. It will be appreciated that the illustrated antenna 36 and radio circuit 38 may represent one or more than one radio access transceivers. The radio circuit 38 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards.

The mobile telephone 12 further includes a sound signal processing circuit 40 for processing audio signals transmitted by and received from the radio circuit 38. Coupled to the sound processing circuit 40 are a speaker 42 and a microphone 44 that enable a user to listen and speak via the mobile telephone 12 as is conventional. The radio circuit 38 and sound processing circuit 40 are each coupled to the control circuit 32 so as to carry out overall operation. Audio data may be passed from the control circuit 32 to the sound signal processing circuit 40 for playback to the user. The audio data may include, for example, audio data from an audio file stored by the memory 28 and retrieved by the control circuit 20, or received audio data such as in the form of streaming audio data from a mobile radio service. The sound processing circuit 40 may include any appropriate buffers, decoders, amplifiers and so forth.

The display 26 may be coupled to the control circuit 32 by a video processing circuit 46 that converts video data to a video signal used to drive the display 26. The video processing circuit 26 may include any appropriate buffers, decoders, video data processors and so forth. The video data may be generated by the control circuit 32, retrieved from a video file that is stored in the memory 28, derived from an incoming video data stream (e.g., mobile television) that is received by the radio circuit 38 or obtained by any other suitable method.

The mobile telephone 12 may further include one or more I/O interface(s) 48. The I/O interface(s) 48 may be in the form of typical mobile telephone I/O interfaces and may include one or more electrical connectors. As is typical, the I/O interface(s) 48 may be used to couple the mobile telephone 12 to a battery charger to charge a battery of a power supply unit (PSU) 50 within the mobile telephone 12. In addition, or in the alternative, the I/O interface(s) 48 may serve to connect the mobile telephone 12 to a headset assembly (e.g., a personal handsfree (PHF) device) that has a wired interface with the mobile telephone 12. Further, the I/O interface(s) 48 may serve to connect the mobile telephone 12 to a personal computer or other device via a data cable for the exchange of data. The mobile telephone 12 may receive operating power via the I/O interface(s) 48 when connected to a vehicle power adapter or an electricity outlet power adapter. The PSU 50 may supply power to operate the mobile telephone 10 in the absence of an external power source.

The mobile telephone 12 also may include a system clock 52 for clocking the various components of the mobile telephone 12, such as the control circuit 32 and the memory 28.

The mobile telephone 12 may include a camera 54 for taking digital pictures and/or movies. Image and/or video files corresponding to the pictures and/or movies may be stored in the memory 28.

The mobile telephone 12 also may include a position data receiver 56, such as a global positioning system (GPS) receiver, Galileo satellite system receiver or the like. The position data receiver 56 may be involved in determining the location of the mobile telephone 12.

The mobile telephone 12 also may include a local wireless interface 58, such as an infrared transceiver and/or an RF interface (e.g., a Bluetooth interface), for establishing communication with an accessory, another mobile radio terminal, a computer or another device. For example, the local wireless interface 58 may operatively couple the mobile telephone 12 to a headset assembly (e.g., a PHF device) in an embodiment where the headset assembly has a corresponding wireless interface.

Figure 5:
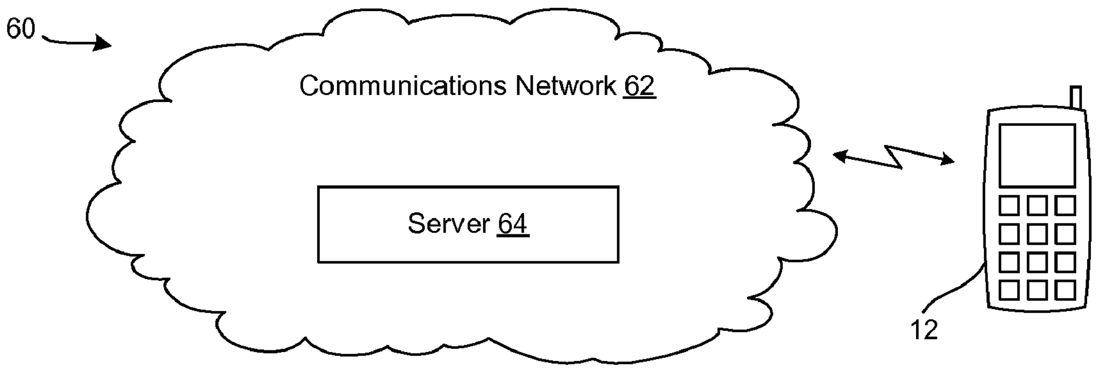
FIG. 5 is a schematic diagram of a communications system in which the mobile telephone of FIG. 3 may operate.

With additional reference to FIG. 5, the mobile telephone 12 may be configured to operate as part of a communications system 60. The system 60 may include a communications network 62 having a server 64 (or servers) for managing calls placed by and destined to the mobile telephone 12, transmitting data to the mobile telephone 12 and carrying out any other support functions. The server 64 communicates with the mobile telephone 12 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 62 may support the communications activity of multiple mobile telephones 12 and other types of end user devices. As will be appreciated, the server 64 may be configured as a typical computer system used to carry out server functions and may include a processor configured to execute software containing logical instructions that embody the functions of the server 64 and a memory to store such software.

With reference to all of the figures, users of mobile telephones 12 may be found to gather in a common location, such as one of the local regions 16. An interactive environment may be established by broadcasting audiovisual content (e.g., mobile television) for reception by the mobile telephones 12. The mobile telephones 12 may further interface with the local server 18 or the remote server 22 to access a webpage or other mechanism through which information may be submitted from the mobile telephone 12 to the server 18, 22. The webpage or other user interface may be designed to have any appropriate fields for completion by the user, such as text fields, check (or "tick") boxes, and so forth. Other data collection mechanisms are possible. For instance, information may be submitted using a message (e.g., an electronic mail message, a text message or a multimedia message) that is transmitted to a message receiver function of the server 18, 22. Also, the information may be submitted over the interface with the local AP 14 or over another network interface, such as an interface with the communications network 62.

In one embodiment, the webpage may be a temporary homepage that is posted to the mobile telephone 12 by the local AP 14 when the mobile telephone 12 commences a WLAN session with the local AP 14. In other embodiment, a link to the webpage may be transferred to the mobile telephone 12. For instance, the link may be attached to the broadcast, such as a link that is embedded in the broadcast as data or pushed over the broadcast channel for display by the mobile telephone 12, automatic retrieval of the webpage by the mobile telephone 12 and/or manual selection of the webpage by the user.

In one embodiment, the users of the mobile telephones 12 may be polled for information, such as an opinion regarding the content of the broadcast. Other information may be user requests for specific content, such a music video that the user is interested in watching. In other embodiments, the information may be collected as part of a contest or game where a prize or reward may be issued for a correct answer or on some other criteria.

The users may be solicited for information in a variety of ways. In one embodiment, the broadcast content may contain a question or other cue to prompt the users to submit an answer or other information over the WLAN interface. In another embodiment, a local deejay (DJ) or other individual may use a public address (PA) system to audibly call for the users to submit an answer or other information over the WLAN. In still another embodiment, the webpage hosted by the server 18, 22 may prompt the users to submit an answer or other information.

These basic embodiments for gathering information from consumers of mobile audiovisual broadcast content may have a number of uses. Several exemplary uses are described in the following examples, but it will be understood that other uses are possible.

Example 1

Local Broadcast and Local Data Collection

The first example involves broadcasting audiovisual content with the system 10 (FIG. 1). The broadcaster 20 is used to broadcast content that is selected by the operator of the place associated with the local region 16. The mobile television content may be received and played back by the mobile telephones 12 so that the users of the mobile telephones 12 may observe the content.

During the broadcast, the local server 18 may host an Internet webpage that may allow the users to submit information. The Internet webpage may be accessed using the Internet browser 35 of the mobile telephones 12.

In one embodiment, the information submitted by the users may be unsolicited by the operator of the broadcaster 20 and/or local server 18. Unsolicited information may be requests for particular items of content, such as music videos. Other unsolicited information may be comments on the content that is being broadcast. The comments may be displayed to an operator of the local server 18 and/or stored for later retrieval or analysis. Also, the comments may be entered into the broadcast so that the comments may be shared among the users. For example, if the content is a music video, the users may make text and/or graphical remarks on the artist, the song or other subjects and those remarks may be added to the mobile television stream for display by the mobile telephones 12 as part of the displayed mobile television content.

In another embodiment, the information submitted by the users may be solicited by the operator of the broadcaster 20 and/or the local server 18. For instance, the users may be requested to submit information. One exemplary solicitation may be for the users to submit a vote. The votes may be tallied to ascertain a collective opinion regarding the content of the broadcast or some other topic. The vote may call for a yes or no response, or an approval or disapproval response. The vote may call for a rating, such as a rating on a number scale (e.g., a rating on a scale of one to ten where ten is the highest score and one is the lowest score), selection from a list of choices (e.g., strongly agree, agree, neither agree or disagree, disagree, and strongly disagree), or some other rating scheme.

In another embodiment, the information submitted by the users may be used as part of a contest or other activity. For example, the operator of the broadcaster 20 and/or the local server 18 may arrange to award a prize to one or more of the users based on information received from the user. The information may be a correct reply to a question. Alternatively, a reward may be given to a randomly selected user from all the users that participated in casting a vote or submitting some other information. Games of chance and games of skill also may be conducted by broadcasting mobile television content to the mobile telephones 12 and receiving information from the users of the mobile telephones 12 via the WLAN. Rewards and prizes may be in tangible form (e.g., objects presumably having value to the "winning" user) that are collected by the user in person or may be electronically transmitted to the mobile telephone 12 associated with the user.

Electronically transmitted items may be a discount code for making a future purchase, an item of audiovisual content (e.g., a music file or a video file), etc.

In some applications of the system 10, the identity of the mobile telephone 12 from which information is gathered may remain unknown to the local server 18. For instance, when tallying votes to ascertain collective opinion on a topic, the identity of the individual mobile telephones 12 may not be of interest. In other applications, the identity of the mobile telephone 12 or the identity of the user of the mobile telephone 12 may play a role in completing the activity. For instance, when a prize or reward is to be given to the user, the identity of the mobile telephone 12 or the identity of the user may be information that is desirable to the operator. The identity of the mobile telephone 12 may be ascertained using a media access control (MAC) address or an Internet Protocol (IP) address of the mobile telephone 12, a device identity (e.g., a device ID), a telephone number, an international mobile equipment identity (IMEI), of the mobile telephone 12 or some other identifier. In another embodiment, the user may be requested to register with or "log into" the local server 18 so that future data submissions to the local server 18 are known to be associated with a particular individual or device. In another embodiment, the user may submit his or her name or an alias as part of the information submission.

Example 2

Wide Area Broadcast and Local Data Collection

Example 2 is similar to example 1, but the mobile audiovisual content is broadcast for wide coverage rather than just coverage across the local region 16. For instance, the content may be a sporting event or a television show that is broadcast across a metropolitan area, a portion of a state or province or an entire state or province, a country or multiple countries.

Similar to example 1, the mobile telephones 12 may tune to the broadcast and may submit information to the local server 18. The submitted information may be any of the solicited or unsolicited forms of information as described with respect to example 1. In this manner, the operator of the local server 18 may poll the users present within the local region 16 for feedback about the wide-distribution mobile broadcast and/or to organize activities and contests among the locally present users. As an example, the content may be a talent competition broadcast as a television show. The local users may be polled to determine their opinion of each contestant in the talent competition and/or to determine which contestant is the best (or worst) performer. Tallies of the user input may be made to determine the collective opinion of the users present at the local region 16. Other information may be collected to rank the contestants from worst to best.

In another embodiment, the broadcast may be displayed on monitors located at the place associated with the local region 16. For instance, multiple televisions may be present at a sports-theme bar. The televisions may be used to display the broadcast. In this embodiment, the broadcast need not be a mobile broadcast and could be a conventional satellite, cable, or airwave television broadcast. The operator of the local server 18 may still involve the users by soliciting information from the users via the WLAN established among the mobile telephones 12 and the local AP 14. Under this embodiment, the submitted information may be any of the solicited or unsolicited forms of information as described with respect to example 1. In this manner, the operator of the local server 18 may poll the users present within the local region 16 for feedback about the wide-distribution broadcast and/or to organize activities and contests among the locally present users.

Example 3

Wide Area Broadcast and Remote Data Collection

Example 3 is similar to example 2 in the sense that the mobile audiovisual content is broadcast for wide coverage. But the information that is collected from the users is collected by the remote server 22. The third example involves gathering information with the system 10' (FIG. 2).

Similar to examples 1 and 2, the mobile telephones 12 may tune to the mobile broadcast. Information may be submitted from the mobile telephones 12 to the remote server 22 via the WLAN established among the mobile telephones 12 and the associated local AP 14, as well as the network 24. The submitted information may be any of the solicited or unsolicited forms of information as described with respect to examples 1 and 2. In this manner, the operator of the remote server 22 may poll the users present within each local region 16 for feedback about the wide-distribution mobile broadcast and/or to organize activities and contests among the users. Similar to the second example, the content may be displayed by monitors present at the respective local regions 16 rather than on the individual mobile telephones 12.

The server 22 may analyze the information to determine how users at the various local regions 16 respond to the content. For instance, all of the users may be polled to submit a vote with respect to an aspect of the content or to rate an aspect of the content. Then, the responses from the users at each local region 16 may be combined to generate a combined metric (e.g., a score or value) that reflects the consensus reaction to the content among the users at the local region 16. The combined metric for each local region 16 may be combined to establish a global metric that reflects the consensus reaction to the content among all users in the system 10'. Also, the combined metric for one or the local regions 16 may be compared against the combined metric for one or more other local regions 16 to track differences in local reaction to the content. In an exemplary application, a political debate, a talent competition, a sporting event or other content may be broadcast and the consensus reaction at one local region 16 may be compared against the consensus reaction at another local region 16. Other statistical analysis of the collected information may be made.

Any suitable technique to distinguish which local region 16 an information submission came from may be employed. In one embodiment, the communication between each mobile telephone 12 and an associated local AP 14 may include a code that is unique to the local region 16. For instance, data packets in a WiFi WLAN each include a service set identifier (SSID) to identify that the packet belongs to the local network. The SSID could be used by the server 22 to distinguish the source of the information by comparing the SSID against a database of known SSIDs and associated locations. In another embodiment, the submitted information may include a location identifier. In still another embodiment, the user may be requested to register with the server 22 and submit a user profile containing location information that may be used in analyzing future information submissions. Depending on how submitted information is to be used, the identity of the user and/or of mobile telephone 12 may remain unknown to the server 22 or may be made available to the server 22 in the manners described above.

Although certain embodiments have been shown and described, it is understood that equivalents and modifications falling within the scope of the appended claims will occur to others who are skilled in the art upon the reading and understanding of this specification.

What is claimed is:

1. A method of interactive broadcasting, comprising:

broadcasting an item of audiovisual content for receipt by mobile electronic devices that are present within a communication range of one or more wireless access points, the one or more wireless access points collectively having a corresponding communication range that forms a local region;

providing an information submission mechanism that is available to the mobile electronic devices over the one or more wireless access points; and receiving information from mobile electronic devices that each playback the same item of audiovisual content from the broadcast in the local region, the information received via the information submission mechanism for local data collection so that the local region is a local interactive environment for users of the mobile electronic devices.

2. The method of claim 1, wherein the broadcast of the item of audiovisual content is a mobile broadcast.

3. The method of claim 1, wherein the broadcast of the item of audiovisual content is carried out using one of a multicast content delivery technique, a point-to-point content delivery technique or a streaming content delivery technique.

4. The method of claim 1, wherein the information submission mechanism is a webpage or a user interface hosted by a server that is in operable communication with the wireless access point.

5. The method of claim 4, wherein a link to the webpage is transferred to the mobile electronic device over a broadcast channel used to broadcast the item of audiovisual content.

6. The method of claim 4, wherein the webpage is a temporary homepage posted to the mobile electronic device when the mobile electronic device establishes communication with the wireless access point.

7. The method of claim 1, wherein the information submission mechanism is a message receiver function for receiving a message transmitted by the mobile electronic device.

8. The method of claim 1, wherein the received information is a response of a user of the mobile electronic device to a question used to solicit an opinion of the user regarding the item of audiovisual content.

9. The method of claim 1, wherein the received information is a user participation in an activity arranged in coordination with the broadcast of the item of audiovisual content.

10. The method of claim 9, further comprising providing a prize to the user of a selected one of the mobile electronic devices from which information was received.

11. The method of claim 10, wherein the prize is transferred electronically to the selected mobile electronic device.

12. The method of claim 10, further comprising identifying an identity of the selected one of the mobile electronic devices.

13. The method of claim 1, wherein the mobile electronic devices that are present within the communication range of the wireless access point form a group of mobile electronic devices.

14. The method of claim 13, further comprising combining the information collected from the group of mobile electronic devices to assess consensus reaction to the item of audiovisual content.

15. The method of claim 14, wherein the consensus reaction to the item of audiovisual content is compared to a consensus reaction to the item of audiovisual content that is derived from at least one other group of mobile electronic devices that are serviced by one or more remotely located wireless access points.

16. A method of interactive broadcasting, comprising:

receiving a broadcast of an item of audiovisual content with a mobile electronic device and playing back the item of audiovisual content to a user of the mobile electronic device;

establishing a data communication link with a wireless access point that services other mobile electronic devices that receive the broadcast and playback the same item of audiovisual content to respective users, wherein the wireless access point has a corresponding range that forms at least part of a local region defined by a collective range of one or more wireless access points that includes the wireless access point, and the other mobile electronic devices are located within the local region; and submitting information from the mobile electronic device to a server via the wireless access point, the information responsive to a request for user input related to the item of audiovisual content so that the local region is a local interactive environment for the user of the mobile electronic device.

17. The method of claim 16, wherein the broadcast of the item of audiovisual content is a mobile broadcast.

18. The method of claim 16, wherein the information is submitted using a webpage or a user interface hosted by the server.

19. The method of claim 16, wherein the submitted information is one of a response to a question used to solicit an opinion of the user regarding the item of audiovisual content or a user participation in an activity arranged in coordination with the broadcast of the item of audiovisual content.

20. A system for interactive broadcasting, comprising:

one or more wireless access points that collectively have a corresponding communication range that forms a local region and provides network connectivity to mobile electronic devices;

a broadcaster used to broadcast an item of audiovisual content to the mobile electronic devices; and a server that hosts an information submission mechanism that is available to the mobile electronic devices over the one or more wireless access points and through which information that is responsive to a request for user input related to the item of audiovisual content is received from mobile electronic devices that each playback the same item of audiovisual content from the broadcast so that the local region is a local interactive environment for users of the mobile electronic devices.

* * * * *